US012548253B2

(12) United States Patent
Trim et al.

(10) Patent No.: US 12,548,253 B2
(45) Date of Patent: Feb. 10, 2026

(54) OPERATIONAL EFFICIENCIES IN IOT AGRICULTURAL ECOSYSTEMS

(71) Applicant: International Business Machines Corporation, Armonk, NY (US)

(72) Inventors: Craig M. Trim, Ventura, CA (US); Adam Lee Griffin, Cohasset, MN (US); Shikhar Kwatra, San Jose, CA (US); Zachary A Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 17/652,982

(22) Filed: Mar. 1, 2022

(65) Prior Publication Data
US 2023/0281924 A1    Sep. 7, 2023

(51) Int. Cl.
| | |
|---|---|
| *G06T 17/05* | (2011.01) |
| *G01S 17/89* | (2020.01) |
| *G06F 16/951* | (2019.01) |
| *G06N 5/022* | (2023.01) |

(52) U.S. Cl.
CPC .............. *G06T 17/05* (2013.01); *G01S 17/89* (2013.01); *G06F 16/951* (2019.01); *G06N 5/022* (2013.01)

(58) Field of Classification Search
CPC ....... G06T 17/05; G06F 16/951; G01S 17/89; G06N 5/022
See application file for complete search history.

(56) References Cited

U.S. PATENT DOCUMENTS

| | | | |
|---|---|---|---|
| 9,945,981 B2* | 4/2018 | Eickelman | .............. G01W 1/14 |
| 10,055,885 B2 | 8/2018 | Goodman | |
| 10,255,670 B1 | 4/2019 | Wu | |

(Continued)

FOREIGN PATENT DOCUMENTS

| | | |
|---|---|---|
| CA | 2800867 A1 | 12/2011 |
| CN | 103364781 B | 9/2015 |

(Continued)

OTHER PUBLICATIONS

Ayaz et al., "Internet-Of-Thing (IoT)-Based Smart Agriculture: Toward Making The Fields Talk", IEEE Access, Special Section on New Technologies for Smart Farming 4.0: Research Challenges and Opportunities, vol. 7, Sep. 23, 2019, 33 Pages.

(Continued)

*Primary Examiner* — Manav Seth
(74) *Attorney, Agent, or Firm* — Anthony M. Pallone

(57) ABSTRACT

In an approach for improving operational efficiencies in IoT agricultural ecosystems, a processor receives a request from a user for a production plan to modify one or more values of a set of values of an area of interest. A processor maps the area of interest using a set of data originating from a LIDAR instrument to create a digital elevation model of the area of interest. A processor creates a knowledge set to train a decision engine. A processor calculates one or more modifications to be made to the one or more values of the set of values of the area of interest. A processor generates a map of applicable land options that the user may interact with to select the one or more modifications to be made to the one or more values of the set of values. A processor plots a finalized rendering of the production plan.

17 Claims, 5 Drawing Sheets

(56) References Cited

U.S. PATENT DOCUMENTS

| | | | |
|---|---|---|---|
| 10,319,050 B2 | 6/2019 | Richt | |
| 10,395,115 B2* | 8/2019 | Kumar | H04N 7/185 |
| 10,705,204 B2* | 7/2020 | Klein | G01S 13/904 |
| 10,705,256 B2* | 7/2020 | Eickelman | G06F 16/244 |
| 10,728,336 B2 | 7/2020 | Akhtar | |
| 10,813,262 B2 | 10/2020 | Shearer | |
| 10,891,482 B2* | 1/2021 | Gurzoni, Jr. | G06V 20/64 |
| 10,943,392 B2 | 3/2021 | Ely | |
| 11,076,589 B1 | 8/2021 | Sibley | |
| 11,327,171 B2* | 5/2022 | Klein | G06V 20/188 |
| 12,302,791 B2* | 5/2025 | Anderson | A01D 43/085 |
| 2016/0232256 A1 | 8/2016 | Lokitz | |
| 2018/0075545 A1* | 3/2018 | Richt | G06V 20/188 |
| 2018/0132422 A1* | 5/2018 | Hassanzadeh | G06Q 50/02 |
| 2018/0132423 A1* | 5/2018 | Rowan | A01C 21/005 |
| 2018/0177136 A1 | 6/2018 | Reimann et al. | |
| 2018/0373932 A1 | 12/2018 | Albrecht | |
| 2019/0050948 A1 | 2/2019 | Perry | |
| 2019/0250882 A1 | 8/2019 | Swansey | |
| 2020/0019856 A1 | 1/2020 | Kulp | |
| 2020/0184214 A1 | 6/2020 | Casas | |
| 2020/0193589 A1 | 6/2020 | Peshlov | |
| 2020/0394579 A1 | 12/2020 | Schmaltz | |
| 2021/0166019 A1 | 6/2021 | White | |
| 2021/0224927 A1 | 7/2021 | Perry | |
| 2022/0369535 A1* | 11/2022 | Berg | A01B 79/005 |

FOREIGN PATENT DOCUMENTS

| | | |
|---|---|---|
| CN | 106779804 A | 5/2017 |
| CN | 108241905 A | 7/2018 |
| WO | 2019040866 A2 | 2/2019 |
| WO | 2023/165310 A1 | 9/2023 |

OTHER PUBLICATIONS

Benowitz, David, "6 Ways LiDAR is Revolutionizing Mapping and Geospatial Data", DJI Enterprise Blog, Sep. 19, 2019, 12 Pages.

Christiansen et al., "Designing and Testing a UAV Mapping System for Agricultural Field Surveying", Sensors 17(12), Nov. 2017, 19 Pages.

EPA, "Laws and Regulations that Apply to Your Agricultural Operation by Farm Activity", United States Environmental Protection Agency, May 3, 2021, 25 Pages.

Gates, Bill, "Can the Wi-Fi chip in your phone help feed the world?", The Gates Notes, Oct. 9, 2018, 3 Pages.

Giant Army, "Universe Sandbox", Giant Army, 2020, 7 Pages.

Howard, Bob, "Lidar and its use in agriculture", Agricultural Innovation, Submission 27, Sep. 2015, 13 Pages.

IBM, "IBM AI and Cloud Technology Helps Agriculture Industry Improve the World's Food and Crop Supply", IBM, IBM Newsroom, May 22, 2019, 4 Pages.

IBM, "Watson Decision Platform for Agriculture", IBM, The Weather Company, Sep. 2018, 3 Pages.

Li et al., "Use of Topographic Models for Mapping Soil Properties and Processes", Soil Systems 2020, 4(2), May 15, 2020, 19 Pages.

Ma et al., "An Innovation Approach for Improving the Accuracy of Digital Elevation Models for Cultivated Land", Remote Sensing 2020, 12(20), Oct. 16, 2020, 20 Pages.

Microsoft, "FarmBeats: AI, Edge & IoT for Agriculture", Microsoft, May 2015, 3 Pages.

Sare, "Managing Cover Crops Profitably, 3rd Edition", SARE Outreach, Sustainable Agriculture Research & Education, 2007, 248 Pages.

Southee et al., "Application of Lidar Terrain Surfaces for Soil Moisture Modeling", Photogrammetric Engineering and Remote Sensing 78 (12), Dec. 2012, 11 Pages.

Stular et al., "Airbone LiDAR-Derived Digital Elevation Model For Archaeology", Remote Sensing 2021, 13(9), May 10, 2021, 21 Pages.

Sugarbaker et al., "The 3D Elevation Program—Precision Agriculture and Other Farm Practices", USGS, Accessed on Nov. 4, 2021, 2 Pages.

USDA, "LiDAR and other Digital Tools for Soil Mapping", United States Department of Agriculture, National Resources Conservation Service, Accessed on Nov. 4, 2021, 23 Pages.

USDA, "Lines on the Land", United States Department of Agriculture, National Resources Conservation Service, Accessed on Nov. 4, 2021, 28 Pages.

Vasisht et al., "FarmBeats: An IoT Platform For Data-Driven Agriculture", Proceedings of the 14th USENIX Symposium on Networked Systems Design and Implementation (NSDI '17), Boston, MA, USA, Mar. 27-29, 2017, 17 Pages.

Mell et al., "The NIST Definition of Cloud Computing", Recommendations of the National Institute of Standards and Technology, NIST Special Publication 800-145, Sep. 2011, 7 pages.

DJI, LiDAR Drone Systems: Using LiDAR Equipped UAVs, Retrived from: https://enterprise-insights.dji.com/blog/lidar-equipped-uavs, Jul. 28, 2022, 21 pages.

Environmental Impact, Retrieved from: https://www.ibm.com/solutions/sustainability/environmental, Jul. 23, 2025, 7 pages.

International Searching Authority, Notification of Transmittal of the International Search Report and the Written Opinion of the International Searching Authority, May 10, 2023, 8 pages, International Application No. PCT/CN2023/075325.

Protocol for Conducting Environmental Compliance Audits under the Federal Insecticide, Fungicide, and Rodenticide Act (FIFRA), Retrieved from: https://web.archive.org/web/20151015084915/http://www2.epa.gov/sites/production/files/documents/apcol-fifra.pdf, Oct. 15, 2015, 138 pages.

Rayome, A., 5 ways IBM Will Transform Farming by 2024, Retrieved from: https://web.archive.org/web/20220630165835/https://www.techrepublic.com/article/5-ways-ibm-will-transform-farming-by-2024/, Feb. 11, 2019, 9 pages.

Software Operating Guide, Retrieved from: https://web.archive.org/web/20160420142150/https://www.newhollandplm.com/upload/3ef92de3-f72a-47f8-9144-6b263239c4e5IntelliSteer%20Operating%20Guide.pdf, Apr. 20, 2016, 240 pages.

Soil Health Management Resources, Retrieved from: https://web.archive.org/web/20240714144259/https://www.alberta.ca/soil-health-management-resources, Jul. 14, 2024, 8 pages.

Sustainability in Business Across Industries, Retrieved from: https://web.archive.org/web/20230312053549/https://www.ibm.com/products/environmental-intelligence-suite/industries, Mar. 12, 2023, 6 pages.

Tiwari, Govt Joins Hands With IBM to Provide Real Time Weather To Farmers, Retrieved from : https://economictimes.indiatimes.com/news/economy/agriculture/govt-joins-hands-with-IBM-to-provide-real-time-weather-to-farmers/articleshow/70074209.cms?utm_source=contentofinterest&utm_medium=text&utm_campaign=cppst, Jul. 4, 2019, 6 pages.

Weilert, T., Geospatial APIs, Retrieved from: https://www.ers.usda.gov/developer/geospatial-apis, Jan. 6, 2025, 7 pages.

\* cited by examiner

OPERATIONAL EFFICIENCIES IN IOT AGRICULTURAL ECOSYSTEMS

BACKGROUND OF THE INVENTION

The present invention relates generally to the field of data processing, and more particularly to improving operational efficiencies in IoT agricultural ecosystems.

A digital elevation model (DEM) is a generic term for digital topographic and/or bathymetric data in all of its various forms, but most often as bare earth elevations at regularly spaced intervals in the x and y directions. A DEM is a means of modeling three-dimensional (3D) terrain, from which geo-spatial uniqueness can be derived. A DEM is generated by many methods, including, but not limited to, ground survey, photogrammetry, Light Detection and Ranging (LIDAR) technology, and Interferometric Synthetic Aperture Radar (IfSAR) technology. LIDAR is an active surface measurement technique that acquires elevation data with a high point density. With the acquired elevation data, LIDAR creates high resolution, 3D digital models of a farmland. IfSAR is a radar technique that generates surface data and has traditionally been used in a dual-pass configuration with spaceborne Synthetic Aperture Radar (SAR) systems.

SUMMARY

Aspects of an embodiment of the present invention disclose a method, computer program product, and computer system for improving operational efficiencies in IoT agricultural ecosystems. A processor receives a request from a user for a production plan to modify one or more values of a set of values of an area of interest in order to improve one or more farming techniques of the area of interest. A processor maps the area of interest using a set of data originating from a LIDAR instrument to create a digital elevation model of the area of interest. A processor creates a knowledge set to train a decision engine on one or more farming techniques for the area of interest. A processor calculates one or more modifications to be made to the one or more values of the set of values of the area of interest using a recommendation engine. A processor generates a map of applicable land options that the user may interact with through a user computing device to select the one or more modifications to be made to the one or more values of the set of values of the area of interest. A processor plots a finalized rendering of the production plan with the one or more modifications selected.

In some aspects of an embodiment of the present invention, subsequent to receiving the request from the user for the production plan to modify the one or more values of the set of values of the area of interest in order to improve the one or more farming techniques of the area of interest, a processor processes the request from the user to identify one or more farmlands located in the area of interest.

In some aspects of an embodiment of the present invention, a processor retrieves a set of user-specific data from a database. A processor retrieves a set of coordinates of the area of interest and one or more property maps of the area of interest from a set of data sources, wherein the set of data sources include the database, one or more IoT-enabled farming equipment utilized by the user or available for the user to utilize, a map service provided by a government agency, and one or more resources available to the public. A processor retrieves a set of historical data on the area of interest from the set of data sources, wherein the set of historical data on the area of interest includes one or more historical benchmark curves acquired over one or more past growing seasons that correspond to a known crop with a known plant date.

In some aspects of an embodiment of the present invention, a processor derives the set of values of the area of interest from the digital elevation model of the area of interest, wherein the set of values of the area of interest include at least one of a type of terrain, an elevation, a slope, a topographic curvature, one or more types of crop growing, one or more types of crop previously grown, a type of soil, a composition of the soil, a water index, a water map, and a waterflow management plan of the area of interest. A processor retrieves a set of external data from a set of geolocated specific bodies of work using a Web Crawler.

In some aspects of an embodiment of the present invention, the knowledge set includes at least one of a set of user-specific data; the set of data on the location of the area of interest; the set of data on specifications of the area of interest; the set of historical data on the area of interest; a set of geolocation-based regulatory rules applicable to the area of interest; a set of external data from a set of geolocated specific bodies of work; and a set of data from one or more manual streams, one or more feeds, and one or more uploads.

In some aspects of an embodiment of the present invention, a processor provides the user with the one or more modifications as land options. A processor flags one or more land options on the map of applicable land options that are not optimal. A processor provides the user with legal guidance and regulatory guidance to consider. A processor provides the user with a body of artifact for an audit of an United States Environmental Protection Agency audit or a regulatory audit. A processor enables the user to manipulate the one or more land options on the map of applicable land options that are recommended. A processor enables the user to select at least one land option from the one or more land options on the map of applicable land options.

In some aspects of an embodiment of the present invention, subsequent to plotting the finalized rendering of the production plan with the one or more modifications selected, a processor transmits the finalized rendering of the production plan to the user. A processor enables the user to accept the finalized rendering of the production plan. Responsive to the user accepting the finalized rendering of the production plan, a processor outputs a set of instructions to the one or more IoT-enabled farming equipment to execute the production plan. A processor enables the one or more IoT-enabled farming equipment to execute the production plan.

These and other features and advantages of the present invention will be described in, or will become apparent to those of ordinary skill in the art in view of, the following detailed description of the example embodiments of the present invention.

DETAILED DESCRIPTION

Figure 1:
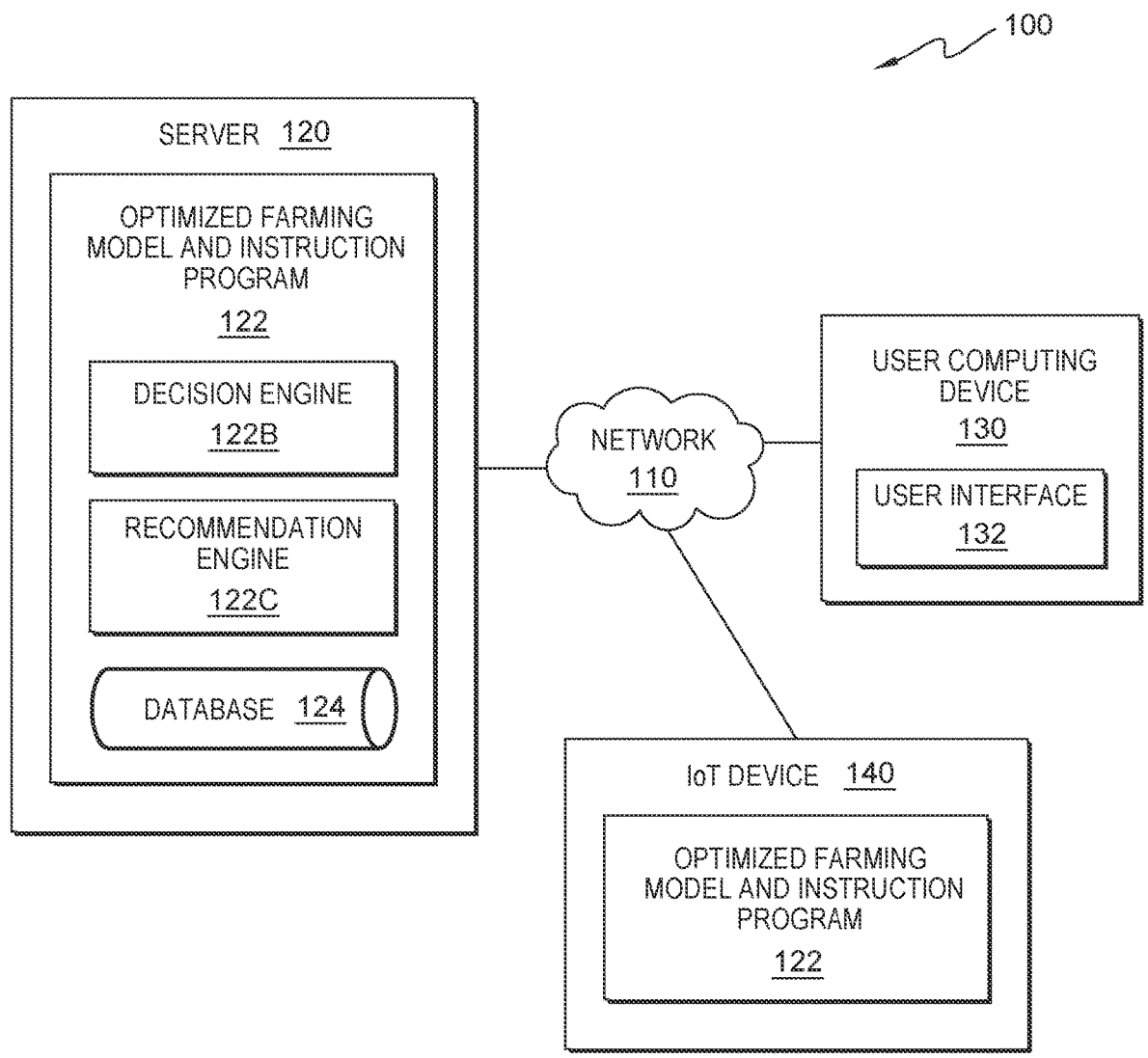
FIG. 1 is a block diagram illustrating a distributed data processing environment, in accordance with an embodiment of the present invention.

Embodiments of the present invention recognize that, as the world population continues to grow and land becomes scarcer, farmers need to farm more efficiently, i.e., to use less farmland to produce crops and to increase the productivity and yield of those farmlands by reducing waste. Embodiments of the present invention recognize that the agriculture industry has turned to artificial intelligence (AI) technologies to understand how to farm more efficiently.

Embodiments of the present invention recognize that a farm generates an estimated five hundred thousand data points on the ground (e.g., on temperature, weather conditions, water usage, soil conditions, etc.) daily and that the number of data points will grow to nearly four million data points per day in the next fifteen years. Embodiments of the present invention recognize that, with the help of AI technologies and machine learning models, farmers can analyze the data points generated on the ground of their farmlands to obtain useful insights.

Embodiments of the present invention recognize that AI technologies help farmers to improve the overall harvest quality and accuracy (i.e., precision agriculture). Precision agriculture uses AI technology to detect diseases in plants, pests, and poor plant nutrition on farmlands. Precision agriculture also uses AI technology to detect and to target weeds and then to decide which herbicides to apply within the region to prevent the over application of herbicides and excessive toxins.

Embodiments of the present invention recognize that AI technologies also help farmers to create seasonal forecasting models to increase productivity. These seasonal forecasting models predict upcoming weather patterns months ahead of time to assist farmers in making decisions. Seasonal forecasting is particularly valuable for small farms in developing countries as their data and knowledge can be limited. Keeping these small farms operational and growing bountiful yields is important as these small farms produce seventy percent of the world's crops.

Embodiments of the present invention recognize that in addition to ground data, farmers are also taking to the sky to monitor farmland. Computer vision and deep learning algorithms process data captured from drones flying over their fields. From drones, AI enabled cameras can capture images of an entire farmland and analyze the images in near-real time to identify problem areas and potential improvements.

Embodiments of the present invention recognize that the current systems and methods to assist farmers with aspects of the farming operations are not fully comprehensive. Embodiments of the present invention recognize that the current systems and methods do not instruct a farmer on what crops or cover crops to select for a farmland, where to place crops or cover crops on a farmland, and when to rotate crops or cover crops based on a topographical analysis of the farmland's terrain, soil composition, water indexes, and/or other factors that influence overall farm productivity and yield; do not instruct a farmer on what crops or cover crops to select for a farmland, where to place crops or cover crops on a farmland, and when to rotate crops or cover crops in order to mitigate top-soil erosion and/or to prevent damage to the water quality of the farmland; do not consider government regulatory guidelines, restrictions, and laws (e.g., the Environmental Protection Agency's environmental guidelines, restrictions, and laws) a farmer must adhere to when making decisions; do not provide a farmer with a complete ecosystem to gather and analyze data from an IoT-based aerial input, to the farmland, and to the IoT-enabled farming equipment utilized by a farmer or available for a farmer to utilize; and do not provide a farmer with an interactive map of the farmland that the farmer can digitally manipulate to determine where to place crops and cover crops and to determine the projected outcomes.

Embodiments of the present invention recognize that the farm and the soil are "assets of value" that a farmer needs to maintain in "good health" via the mitigation of top-soil erosion, the control of water quality, and the proper placement of crops and cover crops based on topographical and environmental factors found on the farmland.

Therefore, embodiments of the present invention provide a system and method that leverages data analytics originating from Light Detection and Ranging (LIDAR) technology, Interferometric Synthetic Aperture Radar (IfSAR) technology, and other various inputs in order to provide a user with intelligent recommendations, insights, and mitigation and/or mitigation-prevention advice on crop and cover crop selection, placement, and rotation on one or more farmlands of the user in order to mitigate top-soil erosion and to prevent damage to the water quality on the one or more farmlands. Additionally, embodiments of the present invention provide a user with intelligent recommendations, insights, and mitigation and/or mitigation-prevention advice on proper crop and cover crop selection, placement, and rotation on one or more farmlands of the user based on a topographical analysis of the farmland's terrain, soil composition, water indexes, and other factors that influence the overall productivity and yield of the farm. Lastly, embodiments of the present invention provide a user with a simulated experience via an interactive map of the one or more farmlands that the user can digitally manipulate to digest inputs and to make high-yield decisions (e.g., determine the proper placement of crops and cover crops).

LIDAR is an active surface measurement technique that acquires elevation data with a high point density. With the acquired elevation data, LIDAR creates high resolution, three-dimensional digital models of a farmland. With these models, LIDAR produces maps of the natural resources on the farmland. LIDAR identifies areas for differential management from the generation of terrain derivatives, including, but not limited to, digital elevation models (DEM) (e.g., image and map slope, elevation, and aspect); vegetation models (e.g., map location and image canopy height); erosion control (e.g., map water flow, wetness index, and water catchments); and compiled landscape visualization and quantitative models and correlative digital maps. LIDAR allows the user to observe, measure, and map out the variations in slope, aspect, and elevation, and to use the results to modify management practices to address limitations on production. For example, LIDAR is used to map the water flow, define the water catchments, locate the trees in an orchard, show the water flow direction at the base of each tree and show the division between water flowing down the tree line or across the tree line.

LIDAR data is collected via an aerial drone, an unmanned aerial vehicle, a satellite, and/or an implementation or a machine on a farmland. LIDAR data is compiled in a LAS file format, which is a public file format for the interchange of 3D point cloud data between data users. The public file format is developed to exchange LIDAR point cloud data, but is also developed to support the exchange of any three dimension (i.e., x, y, and z) tuplet. The LIDAR point cloud data includes one or more point clouds, where every point has an x, y, and z coordinate together with a number of attributes, such as a classification (e.g., building, ground, vegetation, water, etc.) intensity, scan angle, and/or return number.

IfSAR, a radar technique used in geodesy and remote sensing, uses two or more synthetic aperture radar (SAR) images to generate maps of surface deformation or digital elevation. More specifically, IfSAR uses the differences in the phase of the waves returning to the satellite or aircraft to generate the maps. IfSAR can potentially measure millimetre-scale changes in deformation over the span of days to years. IfSAR has applications in geophysical monitoring of natural hazards (e.g., earthquakes, volcanoes, and landslides) and in structural engineering (e.g., monitoring of subsidence and determining structural stability).

Implementation of embodiments of the present invention may take a variety of forms, and exemplary implementation details are discussed subsequently with reference to the Figures.

FIG. 1 is a block diagram illustrating a distributed data processing environment, generally designated 100, in accordance with an embodiment of the present invention. In the depicted embodiment, distributed data processing environment 100 includes server 120, user computing device 130, and IoT device 140, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, other computing devices (not shown), IoT device 140, and other IoT devices (not shown) within distributed data processing environment 100.

Server 120 operates to run optimized farming model and instruction program 122 and to send and/or store data in database 124. In an embodiment, server 120 can send data from database 124 to user computing device 130 and IoT device 140. In an embodiment, server 120 can receive data in database 124 from user computing device 130 and IoT device 140. In one or more embodiments, server 120 can be a standalone computing device, a management server, a web server, a mobile computing device, or any other electronic device or computing system capable of receiving, sending, and processing data and capable of communicating with user computing device 130 and IoT device 140 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130, other computing devices (not shown), IoT device 140, and other IoT devices (not shown) within distributed data processing environment 100 via network 110. Server 120 may include internal and external hardware components, as depicted and described in further detail in FIG. 5.

Optimized farming model and instruction program 122 operates to leverage data analytics originating from LIDAR technology, IfSAR technology, and other various inputs to provide a user with intelligent recommendations, insights, and mitigation and/or mitigation-prevention advice on crop and cover crop selection, placement, and rotation on one or more farmlands of the user to mitigate top-soil erosion and to prevent damage to the water quality on the one or more farmlands. In additional embodiments, optimized farming model and instruction program 122 operates to leverage data originating from a topographical analysis of the farmland's terrain, soil composition, water indexes, and other factors that influence overall farm productivity and yield to provide the user with intelligent recommendations, insights, and mitigation and/or mitigation-prevention advice on crop and cover crop selection, placement, and rotation on the one or more farmlands of the user.

In the depicted embodiment, optimized farming model and instruction program 122 is a standalone program. In another embodiment, optimized farming model and instruction program 122 may be integrated into another software product, such as agriculture management software (i.e., a comprehensive solution for data monitoring, data collection, data management, and data visualization) or precision agriculture and predictive analytics software. In the depicted embodiment, optimized farming model and instruction program 122 contains decision engine 122B and recommendation engine 122C. In the depicted embodiment, optimized farming model and instruction program 122 resides on server 120 and on IoT device 140. In another embodiment, optimized farming model and instruction program 122 may reside on user computing device 130 or on another computing device (not shown), provided that optimized farming model and instruction program 122 has access to network 110. The operational steps of optimized farming model and instruction program 122 are depicted and described in further detail with respect to FIG. 2.

In an embodiment, the user of user computing device 130 registers with server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via optimized farming model and instruction program 122).

Information to create a user profile includes, but is not limited to, a set of user specific data, a set of data on the one or more farmlands affiliated with the request received from the user (hereinafter referred to as the "area of interest"), and a set of data on the specifications of the area of interest. In an embodiment, optimized farming model and instruction program 122 collects user specific data from the user through user interface 132 of user computing device 130.

The user specific data provided includes, but is not limited to, a name of the user, a name of a company owned by the user, an address of the company owned by the user, the location of one or more farmlands owned and/or operated by the user, one or more types of crops currently growing on the one or more farmlands owned and/or operated by the user, one or more types of crops previously grown on the one or more farmlands owned and/or operated by the user, one or more types of products produced, one or more IoT-enabled farming equipment utilized by the user or available for the user to utilize, one or more resources utilized by the user or available for the user to utilize, a number of employees of the company owned by the user, and job functions of the employees of the company owned by the user.

Data on the location of the area of interest includes, but is not limited to, agricultural field identifying data (e.g., acreage, name of the one or more farmlands, one or more identifiers of the one or more farmlands (i.e., geographic identifiers, boundary identifiers, and crop identifiers), and any other suitable data that may be used to identify one or more farmlands, such as a common land unit (CLU), a lot and block number, a parcel number, geographic coordinates and boundaries of the one or more farmlands, a Farm Serial Number (FSN), a farm number, a tract number, a field number, a section, a township, and/or a range).

Data on the specifications of the area of interest includes, but is not limited to, (a) agricultural crop harvest data (e.g., crop type, crop variety, crop rotation, harvest date, Actual Production History (APH), expected yield, actual yield, crop price, crop revenue, grain moisture, tillage practice, previous growing season information); (b) soil data (e.g., type, composition, pH, organic matter (OM), cation exchange capacity (CEC)); (c) planting data (e.g., planting date, seed(s) type, relative maturity (RM) of planted seed(s), seed population); (d) fertilizer data (e.g., nutrient type (Nitrogen, Phosphorous, Potassium), application type, application data, amount, source, method); (e) pesticide data (e.g., pesticide, herbicide, fungicide, other substance or mixture of substances intended for use as a plant regulator, defoliant, or desiccant, application date, amount, source, method); (f) irrigation data (e.g., application date, amount, source, method); (g) weather data (e.g., precipitation, temperature, wind, forecast, pressure, visibility, clouds, heat index, dew point, humidity, snow depth, air quality, sunrise, sunset); and (h) imagery data (e.g., imagery and light spectrum information from an agricultural apparatus sensor, camera, computer, smartphone, tablet, unmanned aerial vehicle, planes or satellite).

Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

In an embodiment, optimized farming model and instruction program 122 creates a user profile. In an embodiment, optimized farming model and instruction program 122 creates a user profile with the set of user specific data, the set of data on the location of the area of interest, the set of data on the specifications of the area of interest, and the relevant data collected. In an embodiment, optimized farming model and instruction program 122 stores the user profile in a database, e.g., database 124. In an embodiment, optimized farming model and instruction program 122 stores the user profile in a database for future iterations of optimized farming model and instruction program 122.

Database 124 operates as a repository for data received, used, and/or generated by optimized farming model and instruction program 122. A database is an organized collection of data. Data includes, but is not limited to, information about user profiles, user preferences (e.g., general user system settings such as alert notifications for user computing device 130); information about alert notification preferences; the set of user specific data; the set of data on the location of the area of interest; the set of data on the specifications of the area of interest; a set of historical data on the area of interest; a set of geolocation-based regulatory rules applicable to the area of interest; a DEM of the area of interest; a set of external data from the set of geolocated specific bodies of work; a set of data from one or more manual streams, one or more feeds, and one or more uploads; one or more necessary modifications to a set of values of the area of interest in order to attain one or more best practice farming techniques; a finalized rendering of a production plan for the area of interest; a set of instructions to execute the production plan; feedback received from the user; and any other data received, used, and/or generated by optimized farming model and instruction program 122.

Database 124 can be implemented with any type of device capable of storing data and configuration files that can be accessed and utilized by server 120, such as a hard disk drive, a database server, or a flash memory. In an embodiment, database 124 is accessed by optimized farming model and instruction program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that optimized farming model and instruction program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Optimized farming model and instruction program 122 enables the authorized and secure processing of personal data.

Optimized farming model and instruction program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Optimized farming model and instruction program 122 provides information regarding personal and/or confidential data and the nature (e.g., type, scope, purpose, duration, etc.) of the processing. Optimized farming model and instruction program 122 provides the user with copies of stored personal and/or confidential company data. Optimized farming model and instruction program 122 allows the correction or completion of incorrect or incomplete personal and/or confidential data. Optimized farming model and instruction program 122 allows for the immediate deletion of personal and/or confidential data.

User computing device 130 operates to run user interface 132 through which a user can interact with optimized farming model and instruction program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with optimized farming model and instruction program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132. User computing device 130 may include components as described in further detail in FIG. 5.

User interface 132 operates as a local user interface between optimized farming model and instruction program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from optimized farming model and instruction program 122 to a user via network 110. User interface 132 can also display or present alerts including information (such as graphics, text, and/or sound) sent from optimized farming model and instruction program 122 to a user via network 110. In an embodiment, user interface 132 is capable of sending and receiving data (i.e., to and from optimized farming model and instruction program 122 via network 110, respectively). Through user interface 132, a user can opt-in to optimized farming model and instruction program 122; create a user profile; set user preferences and alert notification preferences; input a request into a control file; receive one or more necessary modifications to a set of values of an area of interest in order to attain the one or more best practice farming techniques; interact with a map of applicable 'land options'; receive a finalized rendering of the production plan; concur with the finalized rendering of the production plan; receive a request for feedback; and input feedback.

A user preference is a setting that can be customized for a particular user. A set of default user preferences are assigned to each user of optimized farming model and instruction program 122. A user preference editor can be used to update values to change the default user preferences. User preferences that can be customized include, but are not limited to, general user system settings, specific user profile settings, alert notification settings, and machine-learned data collection and storage settings.

Machine-learned data is a user's personalized corpus of data. Machine-learned data includes, but is not limited to, past results of iterations of optimized farming model and instruction program 122.

Optimized farming model and instruction program 122 self-learns by tracking user activity, by classifying and retaining new content, and by improving with each iteration of optimized farming model and instruction program 122. Optimized farming model and instruction program 122 tracks which modification or set of modifications to the set of values of the area of interest are repeatedly generated to attain one or more best practice farming techniques. By tracking such data, optimized farming model and instruction program 122 can learn which modification to the set of values of the area of interest is relevant to the user (e.g., repeatedly generating a modification or set of modifications) and which modification to the set of values of the area of interest is irrelevant (e.g., repeatedly removing a modification or set of modifications).

Optimized farming model and instruction program 122 classifies a modification or a set of modifications based on the likelihood optimized farming model and instruction program 122 will generate the modification or the set of modifications. In an embodiment, optimized farming model and instruction program 122 classifies the modification or the set of modifications on a scale of 1 (i.e., a low chance optimized farming model and instruction program 122 will generate the modification or the set of modifications) to 10 (i.e., a high chance optimized farming model and instruction program 122 will generate the modification or the set of modifications). By classifying and retaining such data, optimized farming model and instruction program 122 can automatically filter out certain modifications over time and ensure that repetitive information is not generated and sent to the user. Instead, optimized farming model and instruction program 122 bypasses the repetitive information and locates new information for the user. Optimized farming model and instruction program 122 can also recommend suggestions (e.g., on the likelihood of the generation of certain modifications) to the user so that the user can manually filter out certain modifications.

IoT device 140 is an IoT-enabled farming equipment, e.g., tractors, planters, and harvesters. In an embodiment, IoT device 140 operates to detect data from the surrounding environment of IoT device 140. In an embodiment, IoT device 140 operates to receive an output from optimized farming model and instruction program 122 on server 120 via network 110. The output received from optimized farming model and instruction program may include, but is not limited to, a finalized rendering of the production plan for the area of interest and a set of instructions to implement the production plan. In an embodiment, IoT device 140 operates to implement the production plan. In an embodiment, distributed data processing environment 100 contains IoT device 140. In another embodiment, distributed data processing environment 100 may contain additional IoT devices (not shown).

Figure 2:
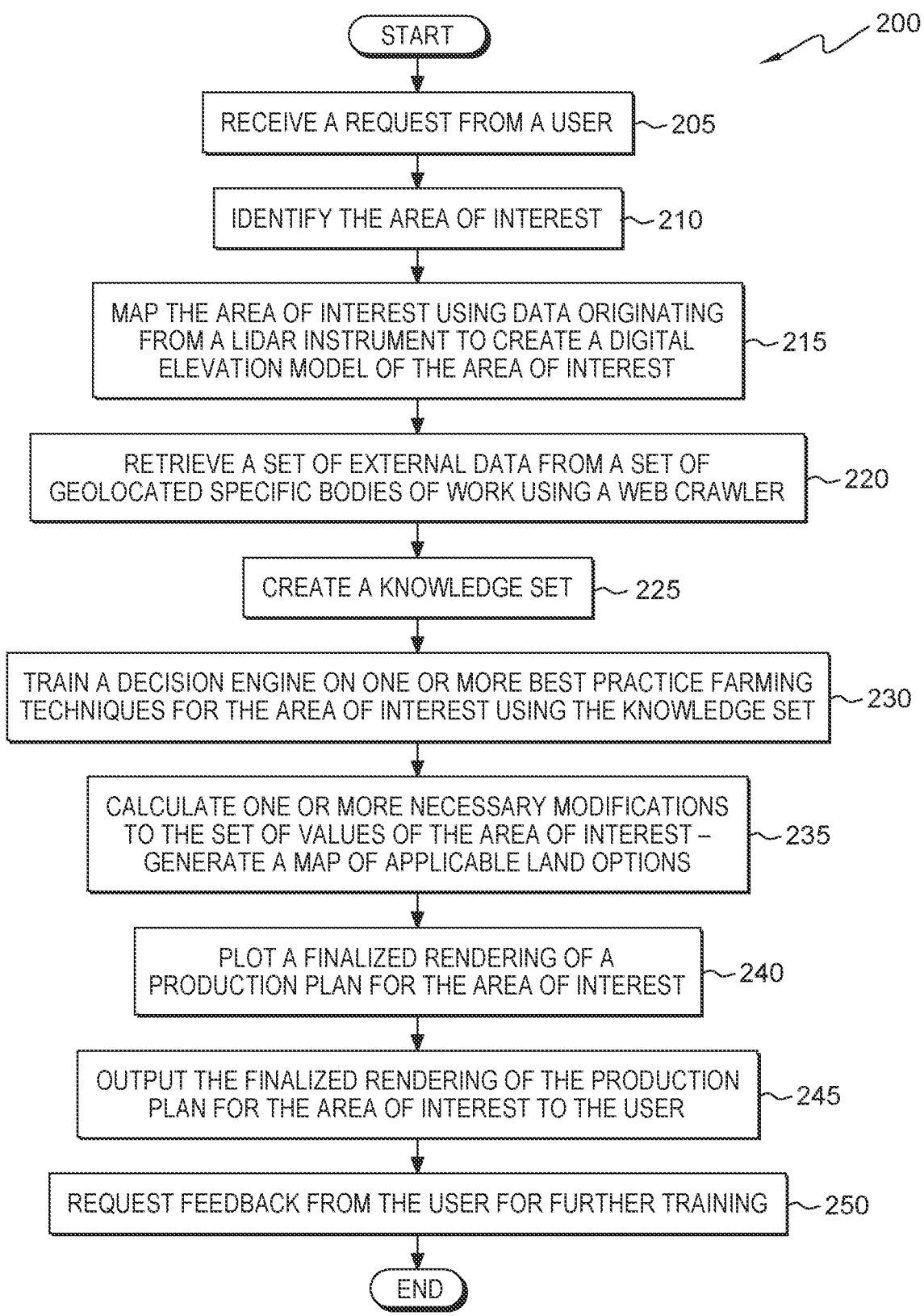
FIG. 2 is a flowchart illustrating the operational steps of an optimized farming model and instruction program, on a server within the distributed data processing environment of FIG. 1, in accordance with an embodiment of the present invention.

FIG. 2 is a flowchart, generally designated 200, illustrating the operational steps of optimized farming model and instruction program 122, on server 120 within distributed data processing environment 100 of FIG. 1, in accordance with an embodiment of the present invention. In an embodiment, optimized farming model and instruction program 122 operates to leverage data analytics originating from LIDAR technology, IfSAR technology, and other various inputs to provide a user with intelligent recommendations, insights, and mitigation and/or mitigation-prevention advice on crop and cover crop selection, placement, and rotation on one or more farmlands of the user to mitigate top-soil erosion and to prevent damage to the water quality on the one or more farmlands. In additional embodiments, optimized farming model and instruction program 122 operates to leverage data originating from a topographical analysis of the farmland's terrain, soil composition, water indexes, and other factors that influence overall farm productivity and yield to provide the user with intelligent recommendations, insights, and mitigation and/or mitigation-prevention advice on crop and cover crop selection, placement, and rotation on the one or more farmlands of the user. It should be appreciated that the process depicted in FIG. 2 illustrates one possible iteration of the process flow, which may be repeated for each request received by optimized farming model and instruction program 122.

In step 205, optimized farming model and instruction program 122 (hereinafter referred to as "program 122") receives a request from a user. As used herein, a user is any individual who is looking for intelligent recommendations, insights, mitigation advice, and/or mitigation-prevention advice on the proper placement of crops and/or cover crops on one or more farmlands to prevent erosion and/or water quality damage. In additional embodiments, a user is any individual who is looking for intelligent recommendations on the proper selection, placement, and/or rotation of crops and/or cover crops on the one or more farmlands based on a topographical analysis of the terrain features, soil composition, water indexes, and other factors of the one or more farmlands that influence the overall productivity and yield of the one or more farmlands. In an embodiment, program 122 receives a request input into a control file by the user through user interface 132 of user computing device 130.

In an embodiment, program 122 processes the request to identify the purpose of the request. The purpose of the request may be, but is not limited to, to determine whether a crop and/or cover crop is suitable for the one or more farmlands (i.e., crop selection), to determine where a crop and/or cover crop should be planted on the one or more farmlands (i.e., crop placement), to determine when to rotate a crop and/or cover crop on the one or more farmlands (i.e., crop rotation), and/or to monitor the quality of the water on the one or more farmlands via filter strips, grassed waterways, contour buffer strips, cover crops, and field border placement mitigation techniques (e.g., water basins, water runoff, and catchment inputs).

In step 210, program 122 identifies the one or more farmlands affiliated with the request received from the user. In an embodiment, responsive to receiving a request from a user, program 122 identifies the one or more farmlands affiliated with the request received from the user. In an embodiment, program 122 identifies the one or more farmlands affiliated with the request received from the user using a set of user-specific data input by the user and stored in the database, i.e., database 124.

In an embodiment, program 122 retrieves a set of coordinates of the area of interest from a set of data sources. In an embodiment, program 122 retrieves one or more property maps of the area of interest from the set of data sources. The set of data sources are selected by program 122 based on the location of the area of interest, including the state and country where the area of interest is located. The set of data sources may include, but are not limited to, database 124, IoT device 140, map services provided by government agencies, such as the ERS Geographic Information System (GIS) map service provided by the U.S. Department of Agriculture (USDA), and other resources and data available to the public, such as an Agriculture Application Programming Interface (API) (e.g., USDA's Agricultural Resource Management Survey (ARMS), Plant.id API, UrtheCast Geosys API, tropicalfruitandveg API, FarmBot API, Greenbook API, BrAPI Breeding API, Farm Market iD API, Agword API).

In an embodiment, program 122 retrieves a set of historical data on the area of interest from the set of data sources. In an embodiment, program 122 retrieves a set of historical data indicative of changes in a Vegetation Index over a specified period of time (i.e., over a growing season). In an embodiment, program 122 gathers a set of historical data including, but not limited to, historical benchmark curves acquired over past growing seasons that correspond to known crops with known plant dates. In an embodiment, program 122 applies a time filter to the set of historical data. In an embodiment, program 122 determines the impact the health of the soil (i.e., the erosion of the soil) has on the crops overtime.

In another embodiment, program 122 retrieves a set of data on the area of interest from one or more manual streams. In another embodiment, program 122 retrieves a set of data on the area of interest from one or more feeds. In another embodiment, program 122 retrieves a set of data on the area of interest from one or more uploads.

In step 215, program 122 maps the area of interest. In an embodiment, responsive to identifying the one or more farmlands affiliated with the request received from the user, program 122 maps the area of interest. In an embodiment, program 122 maps the area of interest using a set of data originating from a LIDAR instrument (i.e., from an aerial drone, an unmanned aerial vehicle (UAV), a satellite, and/or a farming equipment). In another embodiment, program 122 maps the area of interest using a set of data originating from an interferometric synthetic aperture radar (IFSAR) environmental instrument. In another embodiment, program 122 maps the area of interest using weather data.

In an embodiment, program 122 creates a digital elevation model (DEM) of the area of interest. In an embodiment, program 122 derives a set of values of the area of interest from the DEM. The set of values of the area of interest derived from the DEM may include, but are not limited to, a type of terrain, an elevation, a slope, a topographic curvature, one or more types of crop growing, one or more types of crop grown previously, a type of soil, a composition of the soil, a water index, a water map, and a waterflow management plan (i.e., filter strips, grassed waterways, contour buffer strips, cover crops, and field border placement mitigation techniques, e.g., water basins, water runoff, and catchment inputs).

In step 220, program 122 retrieves a set of external data from a set of geolocated specific bodies of work using a Web Crawler. In an embodiment, responsive to creating a DEM of the area of interest, program 122 retrieves the set of external data from the set of geolocated specific bodies of work using the Web Crawler. A Web Crawler is an Internet bot that systematically browses the World Wide Web for the purpose of Web indexing. A Web Crawler copies pages for processing by a search engine, which later indexes the downloaded pages so that the user can search more efficiently. The set of external data from geolocated specific bodies of work can come from regulatory data enforced by the Environmental Protection Agency (EPA), state, local, or federally regulated bodies. The set of external data may include, but is not limited to, geolocation-based regulatory rules applicable to the area of interest.

The set of external data may also include data derived from Subject Matter Experts (SME) within respective domains. SME data may provide subject matter and regional expertise in terms of data classifications, labels, and definitions. SMEs may be used to define parameters and annotate data. SME data may advance the analytics by, for example, further clarifying dataset classifications related to Natural Language Processing (NLP) analysis, sentiment analysis, semantic analysis or relationship extraction analysis as ground truth for the machine learning process. The SME may support the machine learning process, supervised or semi-supervised, by assisting in building an ontology by translating language definitions for particular regions, dimensions, and websites. The SME may be a local resident or an expert in science, agriculture, and meteorology for weather expertise.

The set of external data collected may be in structured (e.g., database tables) or unstructured formats (i.e., HTML, images, word processing documents, text files, PDF documents). The external data collected may be normalized in order to consistently merge the data from multiple datasets. The external data may be parsed into structured data and both forms, structured data and unstructured data, may be stored for future use in a database, e.g., database 124.

For example, the external data may be converted to be used for data analytics and to train a machine learning model in a format such as a comma-separated values (CSV) format or a JavaScript object notation (JSON) format. Once converted, the set of external data may become a training dataset for a machine learning model that self-learns by tracking user activity, that classifies and retains new content, and that improves with each iteration of optimized farming model and instruction program 122.

The training dataset for the machine learning model may be cleansed or repaired for inconsistencies, missing values, insufficient parameters or incorrect delimiters, for example, in the CSV format. Cleansing the data may include a process of detecting and correcting, or removing, corrupt, invalid, or inaccurate data. If the data cannot be repaired, then the section of data that cannot be repaired will be removed. Once the cleansing and repair process has been accomplished, a semantic check will be accomplished by checking for outliers or for outlier verification. Outlier verification may include an alternative approach to fault detection based on limit checking with constant or linear thresholds. The training dataset may be created for different domains or dimensions.

The data preparation process for training the machine learning model may then be normalized to transform the categorical data into numerical values to build a more efficient machine learning model that produces a higher amount of predictive accuracy by using hot encoding techniques. Since each dimension can produce different types of data sources with differing formats, from differing languages, and from differing regions, the cleansing and normalizing to use hot encoding techniques, by a hot encoder, provides greater accuracy during the training phase of the machine learning process. The hot encoder may be used for advanced text analytics, such as adding additional columns to account for added dimensions to train the machine learning model for enriched validation inside the text. Enriched validation may include, for example, adding new columns for dimensions that will improve a ML model. Additionally, when the data preparation process analyzes an external source, the enriched column may be considered the sentiment analysis of the dimension. Data curation may also be used to ingest the data and convert the data to a standard format, enrich the data using semantic analyzers and normalize the data.

In step 225, program 122 creates a knowledge set. In an embodiment, responsive to retrieving the set of external data from the set of geolocated specific bodies of work using the Web Crawler, program 122 creates a knowledge set. The knowledge set may include, but is not limited to, the set of user-specific data; the set of data on the location of the area of interest; the set of data on specifications of the area of interest; the set of historical data on the area of interest; the set of geolocation-based regulatory rules applicable to the area of interest; the DEM of the area of interest; the set of external data from a set of geolocated specific bodies of work; and the set of data from the one or more manual streams, the one or more feeds, and the one or more uploads. In an embodiment, program 122 inputs the knowledge set into decision engine 122B.

In step 230, program 122 trains decision engine 122B on one or more best practice farming techniques for the area of interest using the knowledge set. In an embodiment, responsive to creating the knowledge set, program 122 trains decision engine 122B on one or more best practice farming techniques for the area of interest using the knowledge set (i.e., so that decision engine 122B applies the knowledge set to future production plans). In an embodiment, program 122 trains decision engine 122B using neural networks and deep learning techniques. In an embodiment, program 122 trains decision engine 122B using supervised and semi-supervised learning to incorporate SME input and expert training. The SME input may provide added information that may improve the quality and refine the DEM of the area of interest.

In an embodiment, decision engine 122B is validated and retained. Decision engine 122B may be validated, retained, and tested using datasets that may be implemented using both trained sets of data and new sets of incoming current data. Machine learning, such as using a neural network model, may be used to validate and test the data. Machine learning validation may be used to calibrate the model to combine layers in the neural network and the test set of data may validate against a normalized accuracy, such as using F1 score, precision, and recall.

The F1 score may include a option to gauge prediction performance using binary classification and measuring accuracy, precision, and recall. The F1 score may be a compound metric of the precision and recall. Precision may include a data query relationship between relevant data and retrieved data such that the number of correct relevant data results may be divided by the total number of retrieved data results. Recall may include a data retrieval relationship between the total number of retrieved data results and the successfully retrieved data such that the recall is the number of correct data results divided by the number of results that should have been provided. The compound metric, F1, also known as the F-score, the F-measure and the F1 score, measures accuracy using precision and recall such that the value of 1 is the optimal value of the harmonic average between the precision and the recall and 0 is the least optimal value.

Decision engine 122B at each dimension may be trained, tested, and validated, for example, as a blind set and based on SME input. A blind set may include, for example, a set of annotated documents used for model testing. At each dimension, if the performance meets a predetermined threshold of accuracy, such as 80% of precision, recall or F1 score, then the model may be validated. If the predetermined threshold of accuracy is not met, then the model may be retrained and more SME input may be used until the model is ready for production use.

Decision engine 122B calibrating on a testing dataset may be used to get the best possible precision measure. The precision measure may be instrumental in deciding a risk measure. Calibrating the testing data may include a process to improve the precision with further testing and validation loops by analyzing mistakes in predictions.

In step 235, recommendation engine 122C of program 122 calculates one or more modifications to be made to one or more values of the set of values of the area of interest. In an embodiment, responsive to training decision engine 122B on the one or more best practice farming techniques for the area of interest using the knowledge set, recommendation engine 122C of program 122 calculates one or more modifications to be made to one or more values of the set of values of the area of interest (i.e., one or more modifications to the type of terrain, the elevation, the slope, the topographic curvature, the one or more types of crop growing, the one or more types of crop grown previously, the type of soil, the composition of the soil, the water index, the water map, and the waterflow management plan). In an embodiment, recommendation engine 122C of program 122 calculates ones or more modifications to be made to one or more values of the set of values in order to achieve the purpose of the request of the user (e.g., to determine whether a crop and/or cover crop is suitable for the one or more farmlands (i.e., crop selection); to determine where a crop and/or cover crop should be planted on the one or more farmlands (i.e., crop placement); to determine when to rotate a crop and/or cover crop on the one or more farmlands (i.e., crop rotation); and to monitor the quality of the water on the one or more farmlands via filter strips, grassed waterways, contour buffer strips, cover crops, and field border placement mitigation techniques (e.g., water basins, water runoff, and catchment inputs)). In an embodiment, recommendation engine 122C of program 122 calculates one or more modifications to be made to one or more values of the set of values to attain the one or more best practice farming techniques, i.e., one or more recommended modifications to the area of interest.

In an embodiment, program 122 outputs the one or more modifications to be made to one or more values of the set of values to the user via user interface 132 of user computing device 130.

In an embodiment, recommendation engine 122C of program 122 generates a map of applicable 'land options'. The map of applicable 'land options' is a digitized map of the area of interest showing the one or more modifications to be made to one or more values of the set of values of the area of interest as applicable 'land options'. In an embodiment, program 122 'red flags' land options that are not optimal. In an embodiment, program 122 provides the user with legal guidance and regulatory guidance to consider. In an embodiment, program 122 provides the user with a body of artifact during Environmental Protection Agency (EPA) and/or regulatory audits (e.g., Protocol for Conducting Environmental Compliance Audits under the Federal Insecticide, Fungicide, and Rodenticide Act (FIFRA)).

In an embodiment, program 122 enables the user to interact with the map of applicable 'land options' through user interface 132 of user computing device 130. In an embodiment, program 122 enables the user to manipulate the map of applicable 'land options' by dragging and dropping the applicable 'land options' that are recommended. In an embodiment, program 122 enables the user to select at least one applicable 'land option' from the map of applicable 'land options'.

In step 240, program 122 plots a finalized rendering of a production plan for the area of interest. In an embodiment, responsive to calculating the one or more modifications to be made to the one or more values of the set of values of the area of interest., program 122 plots a finalized rendering of the production plan for the area of interest. In an embodiment, program 122 plots a finalized rendering of the production plan for the area of interest based on the one or more modifications selected to be made to the one or more values of the set of values of the area of interest.

In step 245, program 122 outputs the finalized rendering of the production plan to the user. In an embodiment, responsive to plotting the finalized rendering of the production plan, program 122 outputs the finalized rendering of the production plan to the user. In an embodiment, program 122 outputs the finalized rendering of the production plan to the user through user interface 132 of user computing device 130. In another embodiment, program 122 outputs the finalized rendering of the production plan to IoT device 140 (e.g., IoT-enabled farming equipment, e.g., tractors, planters, harvesters).

In an embodiment, program 122 enables the user to accept the finalized rendering of the production plan. In an embodiment, responsive to the user accepting the finalized rendering of the production plan, program 122 outputs a set of instructions to IoT device 140. In an embodiment, program 122 outputs a set of instructions to IoT device 140 to execute the production plan. In an embodiment, program 122 outputs a set of instructions to IoT device 140 to execute the production plan via third-party integrations with selected partners.

In step 250, program 122 requests feedback from the user for further training. In an embodiment, responsive to outputting the finalized rendering of the production plan to the user, program 122 requests feedback from the user for further training. In an embodiment, program 122 enables the user to score the finalized rendering of the production plan based on effectiveness. For example, the user can score the finalized rendering of the production plan with any number from 1 to 10 where 1 is a finalized rendering that was not effective and 10 is a finalized rendering that was highly effective along with a section for text or type-written feedback, similar to customer reviews when purchasing items online or an emailed survey. In an embodiment, program 122 enables the user to score the finalized rendering of the production plan through user interface 132 of user computing device 130. In an embodiment, program 122 receives feedback from the user. In an embodiment, program 122 applies the feedback received from the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
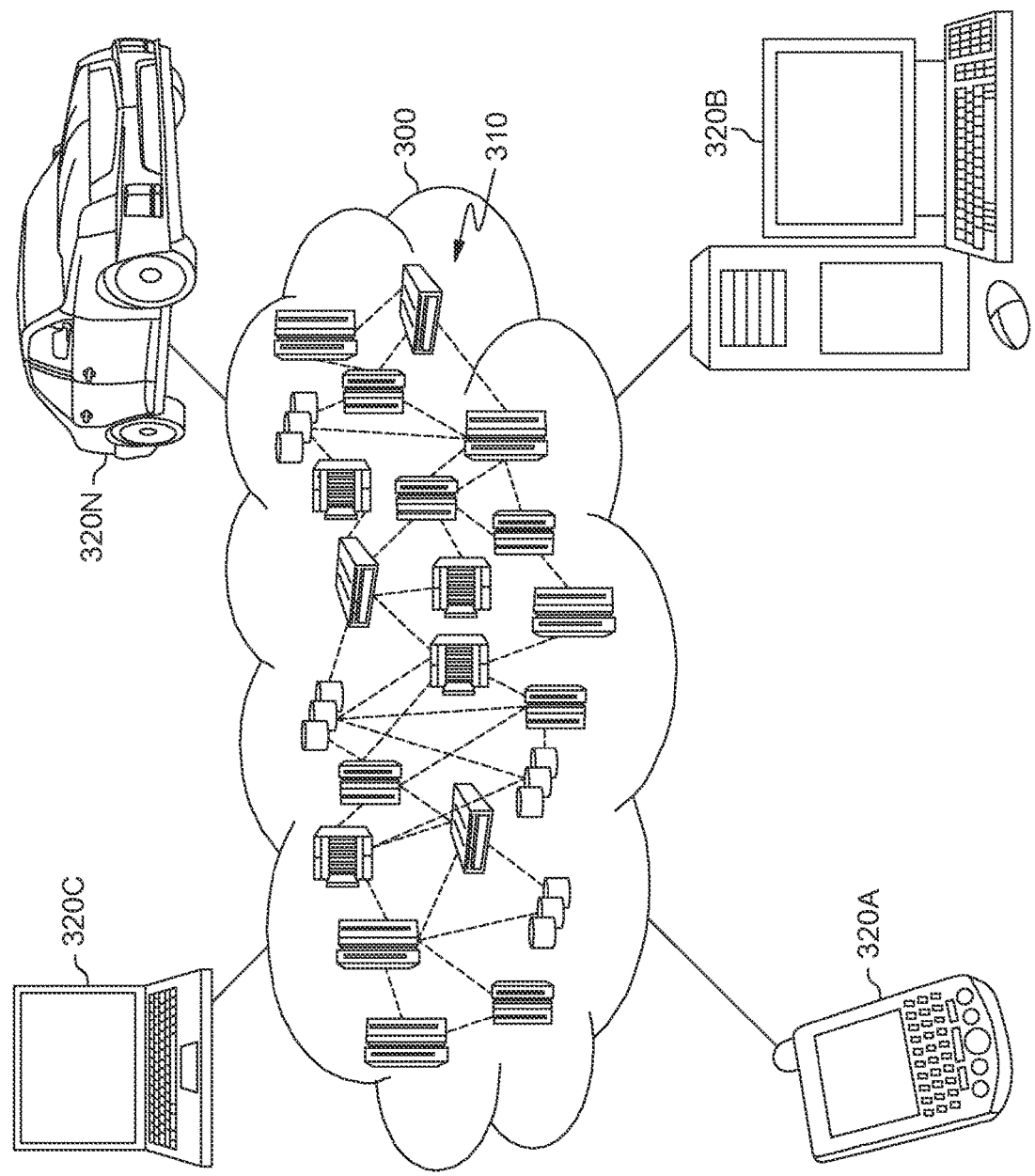
FIG. 3 is a block diagram illustrating an exemplary cloud computing environment, in accordance with an embodiment of the present invention.

FIG. 3 is a block diagram illustrating an exemplary cloud computing environment, generally designated cloud computing environment 300, in accordance with an embodiment of the present invention. As shown, cloud computing environment 300 includes one or more cloud computing nodes 310 with which local computing devices used by cloud consumers, such as, for example, personal digital assistant (PDA) or cellular telephone 320A, desktop computer 320B, laptop computer 320C, and/or automobile computer system 320N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms, and/or software as services for which a cloud consumer does not need to maintain resources on a local computing device. It is understood that the types of computing devices 320A-N shown in FIG. 3 are intended to be illustrative only and that computing nodes 310 and cloud computing environment 300 can communicate with any type of computerized device over any type of network and/or network addressable connection (e.g., using a web browser).

Figure 4:
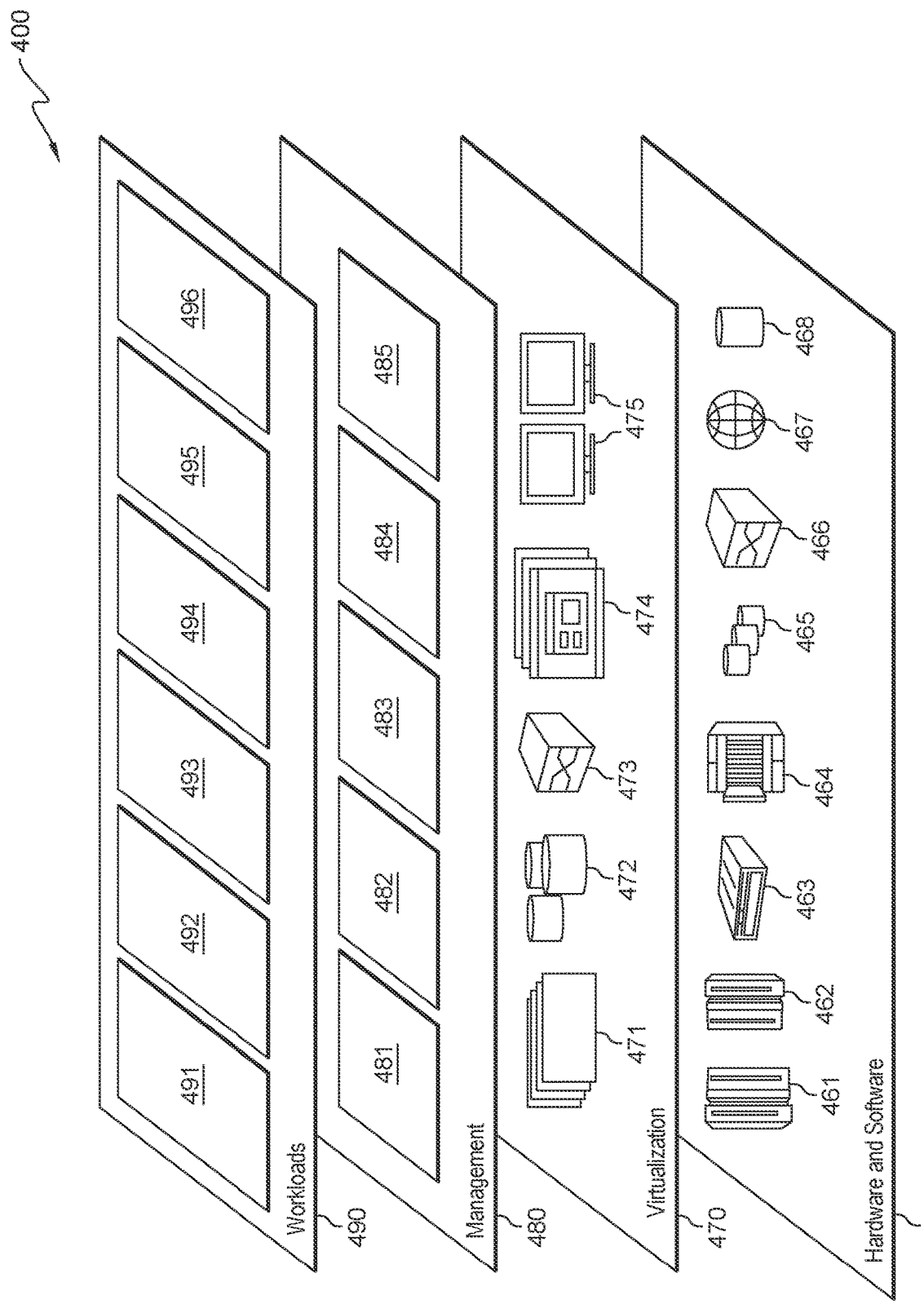
FIG. 4 is a block diagram illustrating a set of functional abstraction model layers of the exemplary cloud computing environment, in accordance with an embodiment of the present invention.

FIG. 4 is a block diagram illustrating a set of functional abstraction model layers, generally designated 400, of the exemplary cloud computing environment (e.g., cloud computing environment 300), in accordance with an embodiment of the present invention. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provides pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include: mapping and navigation 491; software development and lifecycle management 492; virtual classroom education delivery 493; data analytics processing 494; transaction processing 495; and, in the context of the illustrated embodiments of the present invention, various optimization workloads and functions 496.

Figure 5:
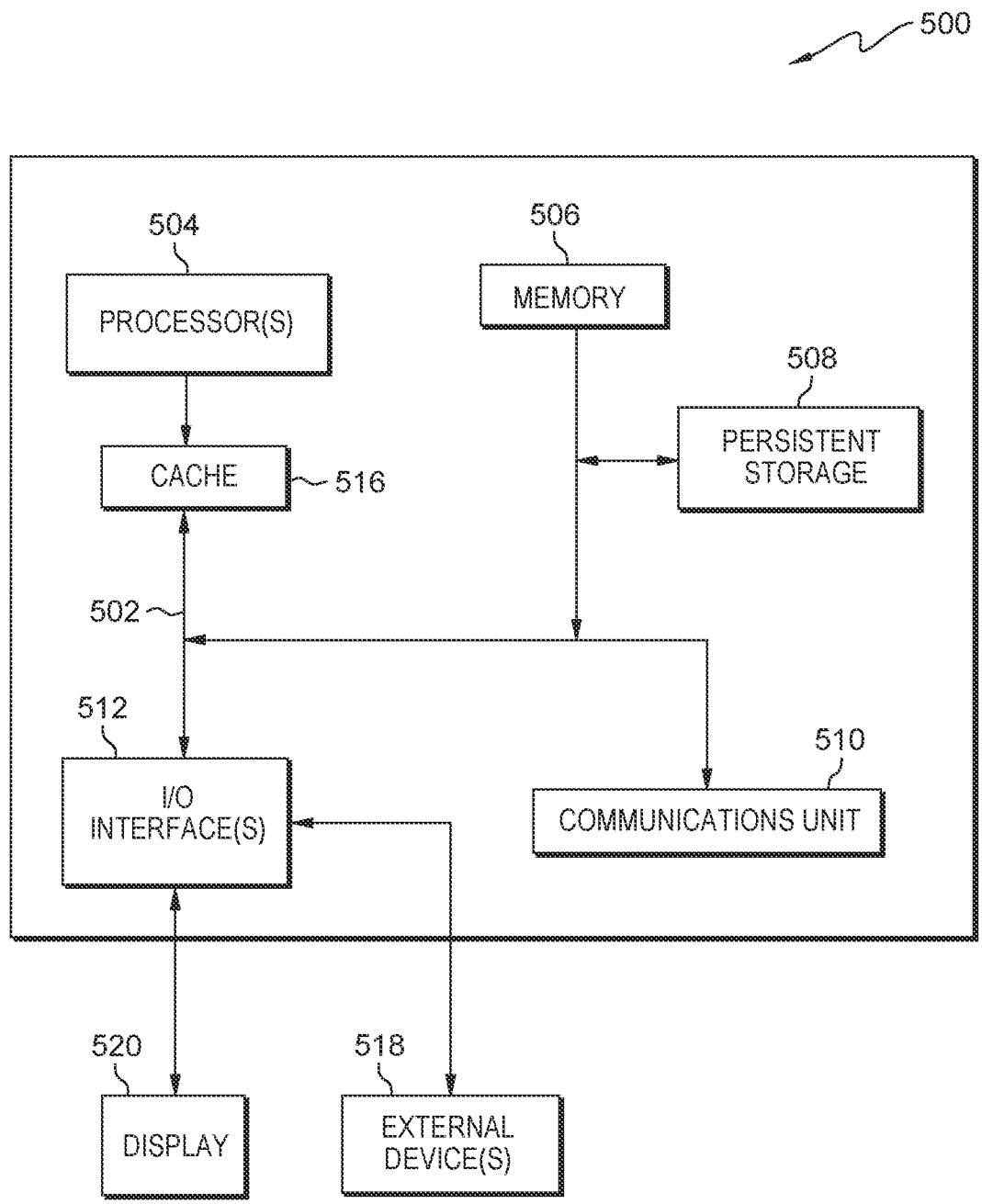
FIG. 5 is a block diagram illustrating the components of the server within the distributed data processing environment of FIG. 1, in accordance with an embodiment of the present invention.

FIG. 5 is a block diagram illustrating the components of computing device 500, suitable for server 120 running program 122 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made. Computing device 500 includes processor(s) 504, memory 506, cache 516, communications fabric 502, persistent storage 508, input/output (I/O) interface(s) 512, and communications unit 510. Communications fabric 502 provides communications between memory 506, cache 516, persistent storage 508, input/output (I/O) interface(s) 512, and communications unit 510. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a cross switch. Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Program instructions and data (e.g., software and data 514) used to practice embodiments of the present invention may be stored in persistent storage 508 and in memory 506 for execution by one or more of the respective processor(s) 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508. Software and data 514 can be stored in persistent storage 508 for access and/or execution by one or more of the respective processor(s) 504 via cache 516. With respect to user computing device 130, software and data 514 includes user interface 132. With respect to server 120, software and data 514 includes optimized farming model and instruction program 122.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data (e.g., software and data 514) used to practice embodiments of the present invention may be downloaded to persistent storage 508 through communications unit 510.

I/O interface(s) 512 allows for input and output of data with other devices that may be connected to each computer system. For example, I/O interface(s) 512 may provide a connection to external device(s) 518, such as a keyboard, a keypad, a touch screen, and/or some other suitable input device. External device(s) 518 can also include portable computer readable storage media, such as, for example, thumb drives, portable optical or magnetic disks, and memory cards. Program instructions and data (e.g., software and data 514) used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more processors, a request from a user for a production plan to modify one or more values of a set of values of an area of interest in order to improve one or more farming techniques of the area of interest;
    mapping, by the one or more processors, the area of interest using a set of data originating from a LIDAR instrument to create a digital elevation model of the area of interest;
    creating, by the one or more processors, a knowledge set to train a decision engine on one or more farming techniques for the area of interest;
    calculating, by the one or more processors, one or more modifications to be made to the one or more values of the set of values of the area of interest using a recommendation engine;
    generating, by the one or more processors, a map of applicable land options that the user may interact with through a user computing device to select the one or more modifications to be made to the one or more values of the set of values of the area of interest, wherein the generating comprises:
        providing the user with the one or more modifications as land options;
        flagging one or more land options on the map of applicable land options that are not optimal;
        providing the user with legal guidance and regulatory guidance to consider;
        providing the user with a body of artifact for an audit of a governmental agency audit or a regulatory audit;
        enabling the user to manipulate the one or more land options on the map of applicable land options that are recommended; and
        enabling the user to select at least one land option from the one or more land options on the map of applicable land options; and
    plotting, by the one or more processors, a finalized rendering of the production plan with the one or more modifications selected.

2. The computer-implemented method of claim 1, further comprising:
    subsequent to receiving the request from the user for the production plan to modify the one or more values of the set of values of the area of interest in order to improve the one or more farming techniques of the area of interest, processing, by the one or more processors, the request from the user to identify one or more farmlands located in the area of interest.

3. The computer-implemented method of claim 2, wherein processing the request from the user to identify the one or more farmlands located in the area of interest further comprises:
    retrieving, by the one or more processors, a set of user-specific data from a database;
    retrieving, by the one or more processors, a set of coordinates of the area of interest and one or more property maps of the area of interest from a set of data sources, wherein the set of data sources include the database, one or more IoT-enabled farming equipment utilized by the user or available for the user to utilize, a map service provided by a government agency, and one or more resources publicly available; and
    retrieving, by the one or more processors, a set of historical data on the area of interest from the set of data sources, wherein the set of historical data on the area of interest includes one or more historical benchmark curves acquired over one or more past growing seasons that correspond to a known crop with a known plant date.

4. The computer-implemented method of claim 1, wherein mapping the area of interest using the set of data originating from the LIDAR instrument to create the digital elevation model of the area of interest further comprises:
    deriving, by the one or more processors, the set of values of the area of interest from the digital elevation model of the area of interest, wherein the set of values of the area of interest include at least one of a type of terrain, an elevation, a slope, a topographic curvature, one or more types of crop growing, one or more types of crop previously grown, a type of soil, a composition of the soil, a water index, a water map, and a waterflow management plan of the area of interest; and
    retrieving, by the one or more processors, a set of external data from a set of geolocated specific bodies of work using a Web Crawler.

5. The computer-implemented method of claim 3, wherein the knowledge set includes at least one of a set of user-specific data; the set of data on the location of the area of interest; the set of data on specifications of the area of interest; the set of historical data on the area of interest; a set of geolocation-based regulatory rules applicable to the area of interest; a set of external data from a set of geolocated specific bodies of work; and a set of data from one or more manual streams, one or more feeds, and one or more uploads.

6. The computer-implemented method of claim 3, further comprising:
    subsequent to plotting the finalized rendering of the production plan with the one or more modifications selected, transmitting, by the one or more processors, the finalized rendering of the production plan to the user;
    enabling, by the one or more processors, the user to accept the finalized rendering of the production plan;
    responsive to the user accepting the finalized rendering of the production plan, outputting, by the one or more processors, a set of instructions to the one or more IoT-enabled farming equipment to execute the production plan; and
    enabling, by the one or more processors, the one or more IoT-enabled farming equipment to execute the production plan.

7. A computer program product comprising:
one or more computer readable storage media and program instructions stored on the one or more computer readable storage media, the program instructions comprising:
program instructions to receive a request from a user for a production plan to modify one or more values of a set of values of an area of interest in order to improve one or more farming techniques of the area of interest;
program instructions to map the area of interest using a set of data originating from a LIDAR instrument to create a digital elevation model of the area of interest;
program instructions to create a knowledge set to train a decision engine on one or more farming techniques for the area of interest;
program instructions to calculate one or more modifications to be made to the one or more values of the set of values of the area of interest using a recommendation engine;
program instructions to generate a map of applicable land options that the user may interact with through a user computing device to select the one or more modifications to be made to the one or more values of the set of values of the area of interest, wherein the generating comprises:
providing the user with the one or more modifications as land options;
flagging one or more land options on the map of applicable land options that are not optimal;
providing the user with legal guidance and regulatory guidance to consider;
providing the user with a body of artifact for an audit of a governmental agency audit or a regulatory audit;
enabling the user to manipulate the one or more land options on the map of applicable land options that are recommended; and
enabling the user to select at least one land option from the one or more land options on the map of applicable land options; and
program instructions to plot a finalized rendering of the production plan with the one or more modifications selected.

8. The computer program product of claim 7, further comprising:
subsequent to receiving the request from the user for the production plan to modify the one or more values of the set of values of the area of interest in order to improve the one or more farming techniques of the area of interest, program instructions to process the request from the user to identify one or more farmlands located in the area of interest.

9. The computer program product of claim 8, wherein processing the request from the user to identify the one or more farmlands located in the area of interest further comprises:
program instructions to retrieve a set of user-specific data from a database;
program instructions to retrieve a set of user-specific data from a database;
program instructions to retrieve a set of coordinates of the area of interest and one or more property maps of the area of interest from a set of data sources, wherein the set of data sources include the database, one or more IoT-enabled farming equipment utilized by the user or available for the user to utilize, a map service provided by a government agency, and one or more resources publicly available; and
program instructions to retrieve a set of historical data on the area of interest from the set of data sources, wherein the set of historical data on the area of interest includes one or more historical benchmark curves acquired over one or more past growing seasons that correspond to a known crop with a known plant date.

10. The computer program product of claim 7, wherein mapping the area of interest using the set of data originating from the LIDAR instrument to create the digital elevation model of the area of interest further comprises:
program instructions to derive the set of values of the area of interest from the digital elevation model of the area of interest, wherein the set of values of the area of interest include at least one of a type of terrain, an elevation, a slope, a topographic curvature, one or more types of crop growing, one or more types of crop previously grown, a type of soil, a composition of the soil, a water index, a water map, and a waterflow management plan of the area of interest; and
program instructions to retrieve a set of external data from a set of geolocated specific bodies of work using a Web Crawler.

11. The computer program product of claim 9, wherein the knowledge set includes at least one of a set of user-specific data; the set of data on the location of the area of interest; the set of data on specifications of the area of interest; the set of historical data on the area of interest; a set of geolocation-based regulatory rules applicable to the area of interest; a set of external data from a set of geolocated specific bodies of work; and a set of data from one or more manual streams, one or more feeds, and one or more uploads.

12. The computer program product of claim 9, further comprising:
subsequent to plotting the finalized rendering of the production plan with the one or more modifications selected, program instructions to transmit the finalized rendering of the production plan to the user;
program instructions to enable the user to accept the finalized rendering of the production plan;
responsive to the user accepting the finalized rendering of the production plan, program instructions to output a set of instructions to the one or more IoT-enabled farming equipment to execute the production plan; and
program instructions to enable the one or more IoT-enabled farming equipment to execute the production plan.

13. A computer system comprising:
one or more computer processors;
one or more computer readable storage media;
program instructions collectively stored on the one or more computer readable storage media for execution by at least one of the one or more computer processors, the stored program instructions comprising:
program instructions to receive a request from a user for a production plan to modify one or more values of a set of values of an area of interest in order to improve one or more farming techniques of the area of interest;
program instructions to map the area of interest using a set of data originating from a LIDAR instrument to create a digital elevation model of the area of interest;
program instructions to create a knowledge set to train a decision engine on one or more farming techniques for the area of interest;

program instructions to calculate one or more modifications to be made to the one or more values of the set of values of the area of interest using a recommendation engine;

program instructions to generate a map of applicable land options that the user may interact with through a user computing device to select the one or more modifications to be made to the one or more values of the set of values of the area of interest, wherein the generating comprises:

providing the user with the one or more modifications as land options;

flagging one or more land options on the map of applicable land options that are not optimal;

providing the user with legal guidance and regulatory guidance to consider;

providing the user with a body of artifact for an audit of a governmental agency audit or a regulatory audit;

enabling the user to manipulate the one or more land options on the map of applicable land options that are recommended; and enabling the user to select at least one land option from the one or more land options on the map of applicable land options; and program instructions to plot a finalized rendering of the production plan with the one or more modifications selected.

14. The computer system of claim 13, further comprising: subsequent to receiving the request from the user for the production plan to modify the one or more values of the set of values of the area of interest in order to improve the one or more farming techniques of the area of interest, program instructions to process the request from the user to identify one or more farmlands located in the area of interest.

15. The computer system of claim 14, wherein processing the request from the user to identify the one or more farmlands located in the area of interest further comprises:

program instructions to retrieve a set of user-specific data from a database;

program instructions to retrieve a set of coordinates of the area of interest and one or more property maps of the area of interest from a set of data sources, wherein the set of data sources include the database, one or more IoT-enabled farming equipment utilized by the user or available for the user to utilize, a map service provided by a government agency, and one or more resources publicly available; and program instructions to retrieve a set of historical data on the area of interest from the set of data sources, wherein the set of historical data on the area of interest includes one or more historical benchmark curves acquired over one or more past growing seasons that correspond to a known crop with a known plant date.

16. The computer system of claim 13, wherein mapping the area of interest using the set of data originating from the LIDAR instrument to create the digital elevation model of the area of interest further comprises:

program instructions to derive the set of values of the area of interest from the digital elevation model of the area of interest, wherein the set of values of the area of interest include at least one of a type of terrain, an elevation, a slope, a topographic curvature, one or more types of crop growing, one or more types of crop previously grown, a type of soil, a composition of the soil, a water index, a water map, and a waterflow management plan of the area of interest; and program instructions to retrieve a set of external data from a set of geolocated specific bodies of work using a Web Crawler.

17. The computer system of claim 15, further comprising:

subsequent to plotting the finalized rendering of the production plan with the one or more modifications selected, program instructions to transmit the finalized rendering of the production plan to the user;

program instructions to enable the user to accept the finalized rendering of the production plan;

responsive to the user accepting the finalized rendering of the production plan, program instructions to output a set of instructions to the one or more IoT-enabled farming equipment to execute the production plan; and program instructions to enable the one or more IoT-enabled farming equipment to execute the production plan.

* * * * *